United States Patent [19]
Braukmann

[11] 3,818,929
[45] June 25, 1974

[54] REDUCED PRESSURE BACKFLOW PREVENTER VALVE
[76] Inventor: Heinz Werner Braukmann, 98 Heathcote Ave., Willowdale, Ontario, Canada
[22] Filed: Apr. 23, 1973
[21] Appl. No.: 353,334

[52] U.S. Cl. .............................. 137/218
[51] Int. Cl. ................. F16k 45/00, E03c 1/10
[58] Field of Search ............... 137/217, 218, 102

[56] References Cited
UNITED STATES PATENTS
| 2,603,231 | 7/1952 | Birkemeier | 137/218 |
| 2,946,186 | 7/1960 | Southam | 137/501 X |
| 3,171,423 | 3/1965 | Dillon | 137/218 |
| 3,636,968 | 1/1972 | Tine | 137/102 |

Primary Examiner—William R. Cline
Assistant Examiner—Gerald A. Michalsky
Attorney, Agent, or Firm—Cecil C. Kent

[57] ABSTRACT

A backflow preventer valve has a body with a vent chamber, the inner end of which forms a relief valve seat; the base of a cup member, supported on the inner edge of an annular flexible diaphragm with the outer edge secured to the valve body, engages with the relief valve seat to close off the vent chamber. The cup member has an internal check valve seat and contains a check valve biased against the check valve seat.

2 Claims, 3 Drawing Figures

PATENTED JUN 25 1974 3,818,929

REDUCED PRESSURE BACKFLOW PREVENTER VALVE

FIELD OF THE INVENTION

This invention relates to a backflow preventer valve wherein backflow in the valve due to an increase in pressure downstream is prevented from contaminating the supply line by providing venting means which is normally closed by a relief valve but when backflow occurs the relief valve moves to permit fluid to pass through the venting means.

PRIOR ART

Valves of this nature have been develped which include two resiliently seated spring loaded check valves which define an intermediate chamber having a pressure lower than that exerted at the inlet to the valve. The chamber is relieved through a differential control valve operated by the difference between the inlet and intermediate chamber pressures. A well known type of differential control valve is formed of a flexible diaphragm which lifts from a seat when pressure drops at the inlet of the valve or builds up in a reverse effect at the outlet side.

The flexible diaphragms may be of two types. The first covers the control portion of the inlet to the valve body in which normal flow of the liquid takes place over the periphery of the diaphragm. Such a valve is described in U.S. Pat. No. 3636968 and from the description it will be seen that two seats are necessary for alternate operation of the diaphragm.

The second arrangement which necessitates only one seat for the diaphragm is illustrated in U.S. Pat. No. 3171423. The flexible diaphragm is secured to the wall of the valve body and the diaphragm has a central aperture through which the liquid flows in normal operation to activate a spring loaded check valve. The upper surface of the diaphragm carries a rigid washer which is designed to provide the necessary backing for the diaphragm where it encounters the seat.

It is an object of the invention to provide a reduced pressure backflow preventer valve which is simple in construction and also effective at widely varying pressures.

BRIEF DESCRIPTION OF THE DRAWINGS

The invention will now be described in relation to the accompanying drawings in which.

DESCRIPTION OF A PREFERRED EMBODIMENT

Figure 1:
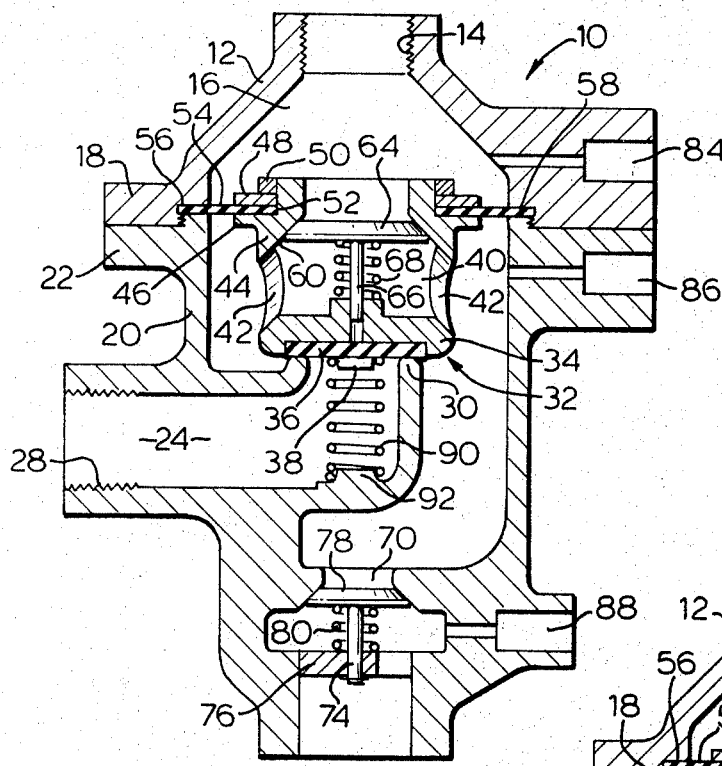
FIG. 1 is a vertical axial cross-section view of a backflow preventer and anti-siphon valve constructed in accordance with the invention.

The valve 10 includes an upstream annular body part generally denoted by the numeral 12 which is provided with a female threaded upstream connector sleeve 14 adapted to be connected to a liquid intake pipe not shown. The other end of the sleeve 14 merges into a frusto-conical body portion 16 which terminates in a female threaded portion 18.

The valve 10 also has a downstream annular valve body portion 20 which is provided with a male threaded boss 22 for attachment to the female threaded ring portion 18.

The annular valve body portion 20 downstream of the boss 22 has an intermediate chamber 24 which leads externally therefrom and may be female threaded as at 28 to provide means for connection to a vent or relief pipe not shown. The chamber 24 curves upward in the body portion 20 to provide a substantially circular and horizontally disposed relief valve seat 30.

A cup-like member generally denoted by the numeral 32 is disposed above the valve seat 30. The cup member has a base 34 to which is secured on its underside a rubber-like disc 36 of selected hardness and secured in place by a centrally positioned nut 38 to the base 34. The disc 36 is larger in diameter than the relief valve seat 30 and as described hereunder is engagable therewith when flow takes place through the valve 10 from the inlet to the outlet.

The cup member 32 has an upstanding wall 40 provided with apertues 42. The wall 40 is enlarged as at 44 above the apertures 42 and has an outwardly extending flange 46.

Seated on the flange 46 and secured thereto by a washer 48 and coacting nut 50 is the inner edge 52 of a flexible annular diaphragm 54. The outer peripheral portion 56 of the diaphragm 54 is secured in a recess 58 formed between the female threaded ring portion 18 and the valve body portion 20.

The inside of the enlarged portion of the wall 40 is flared as at 60 to provide a check valve seat. Located in the cup member 32 is an inlet check valve disc 64 slidable on a rod 66 and biased by a spring 68 bearing against the inside of the base 34 of the cup member 32.

Downstream of the intermediate chamber 24, the valve body 20 is constricted as at 70 and then flared outwards to form an outlet check valve seat 72. Downstream of the constriction 70 is a centrally positioned guide 74 supported by spaced apart arms 76 secured to valve body 20. An outlet check valve disc 78 slides on the guide and bears against the valve seat 72 in conventional manner through the action of a spring 80 surrounding the guide 74.

In well known manner taps 84, 86 and 88 are provided in the valve 10 to sense static pressure.

Figure 2:
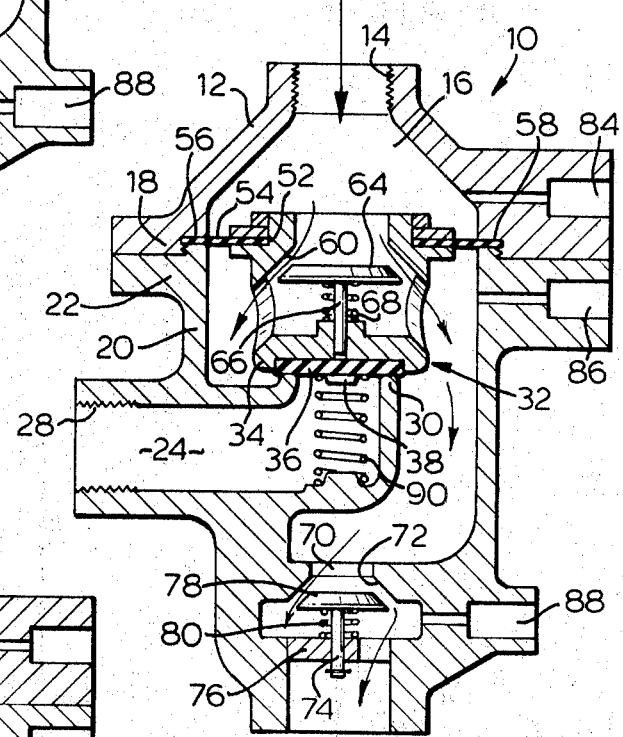
FIG. 2 is a view of the valve shown in FIG. 1 with the diaphragm and check valves positioned so as to permit flow through the valve.

The cup-like member 32 acts as an acceptor for the inlet check valve disc 64 and also its base 34 seats against the relief valve seat 30 to seal the intermediate vent chamber 24 when the fluid is flowing through the valve 10 in the intended direction as illustrated in FIG. 2.

Figure 3:
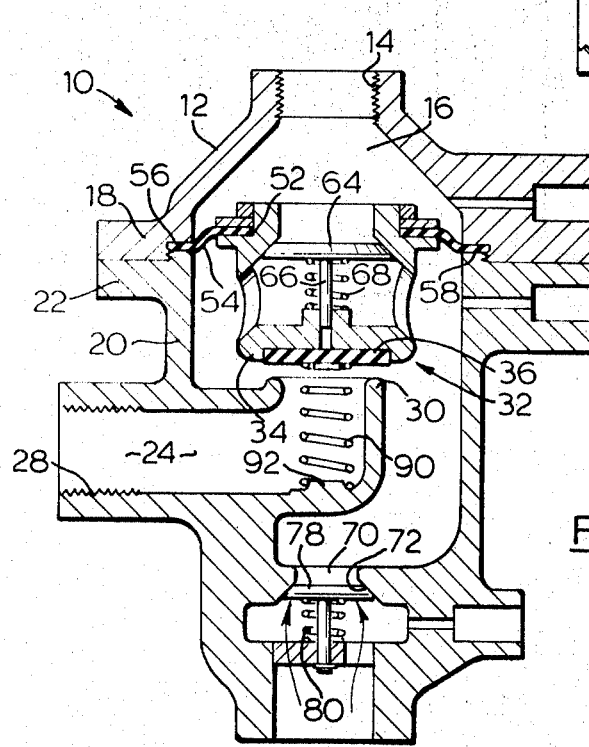
FIG. 3 is a view of the valve shown in FIG. 1 with the diaphragm moved to a position where the flow is vented to atmosphere either because the pressure differential across the inlet valve has fallen below a first predetermined level or when the downstream pressure is high enough in relation to the upstream pressure or when the outlet check valve does not seat properly due to the presence for instance of a piece of dirt on the seat.

In the event of back pressure arising from any cause, the inlet valve disc 64 closes immediately and seals off the inlet. Also the base 34 of the cup-like member 32 moves upward from the relief valve seat 30 due to the pressure exerted on the underside of the flexible portion of the diaphragm 54 as illustrated in FIG. 3.

The effect of back pressure is assisted by disposing in the intermediate chamber 24 a spring 90 bearing against the base 34 of the cup member 32; the spring 90 is supported on a suitable platform 92 in the intermediate chamber 24.

What is claimed is:

1. A back flow preventer valve comprising a valve body, an inlet chamber in said valve body connected to a liquid source, a wall in said valve body defining an intermediate chamber leading exteriorly thereof, the inner end of said wall forming a relief valve seat, a cup like member in said valve body having a base engageable with said relief valve seat to seal off said intermediate chamber, said cup like member having a first opening communicating with said inlet chamber, an outlet chamber in said valve body in part surrounding said intermediate chamber, a second opening in said cup like member communicating with said outlet chamber, a flexible annular membrane secured at its outward edge to said valve body and at its inward edge to said cup like member, a check valve seat in said cup like member, an inlet check valve in said cup like member biased against said check valve seat and movable away therefrom at a predetermined pressure exerted in said inlet chamber, said cup like member being movable from said relief valve seat when back pressure is exerted on said flexible membrane to permit fluid to enter said intermediate chamber.

2. A valve according to claim 1 having spring means in said intermediate chamber to bear against said cup like member and assist the relieving action of said flexible diaphragm.

* * * * *